United States Patent [19]

Ney

[11] Patent Number: 4,553,857

[45] Date of Patent: Nov. 19, 1985

[54] REVERSIBLE JOURNAL BEARING UNIFLOW LUBRICATION SYSTEM

[76] Inventor: Robert J. Ney, 2275 E. Bay Dr., Ste. 1103B, Clearwater, Fla. 33546

[21] Appl. No.: 564,282

[22] Filed: Dec. 22, 1983

[51] Int. Cl.[4] .......................... F16C 3/14; F16C 9/03; F16C 33/06

[52] U.S. Cl. .................................... 384/398; 384/293

[58] Field of Search ............... 384/398, 399, 293, 292, 384/113, 118

[56] References Cited

U.S. PATENT DOCUMENTS

| | | | |
|---|---|---|---|
| 1,637,317 | 9/1921 | Shoemaker | 384/293 X |
| 2,067,019 | 1/1937 | Fitzsimmons et al. | 384/292 |
| 2,397,124 | 5/1942 | Buffington et al. | 384/292 X |
| 2,598,476 | 1/1949 | Wightman | 384/398 |

OTHER PUBLICATIONS

Chow, Vohr, Helical-Grooved Journal Bearing Operated in Turbulent Regime, Journal of Lubrication Tech., Trans. ASME, 1969 LUB-28.

Ng, Pan, A Linearized Turbulent Lubrication Theory, Journal of Basic Eng., Trans. of ASME, 9-1965.

Primary Examiner—Leonard D. Christian
Assistant Examiner—Lynn M. Sohacki

[57] ABSTRACT

A reversible vertical journal bearing with a self contained closed circuit lubrication system, directed toward ceiling fan applications, is disclosed. Lubricant pumping, from a reservoir, is accomplished by an array of throttled, high pressure, triangular pumping cavities on the journal surface. The array is completely symmetrical about the journal axis, so that unidirectional lubricant flow is produced at either direction of journal rotation. The lubricant is collected in a manifold at the top of the bearing, and it is gravity fed back into the reservoir. Optimum design parameters for a stable high load bearing capability device are indicated.

2 Claims, 3 Drawing Figures

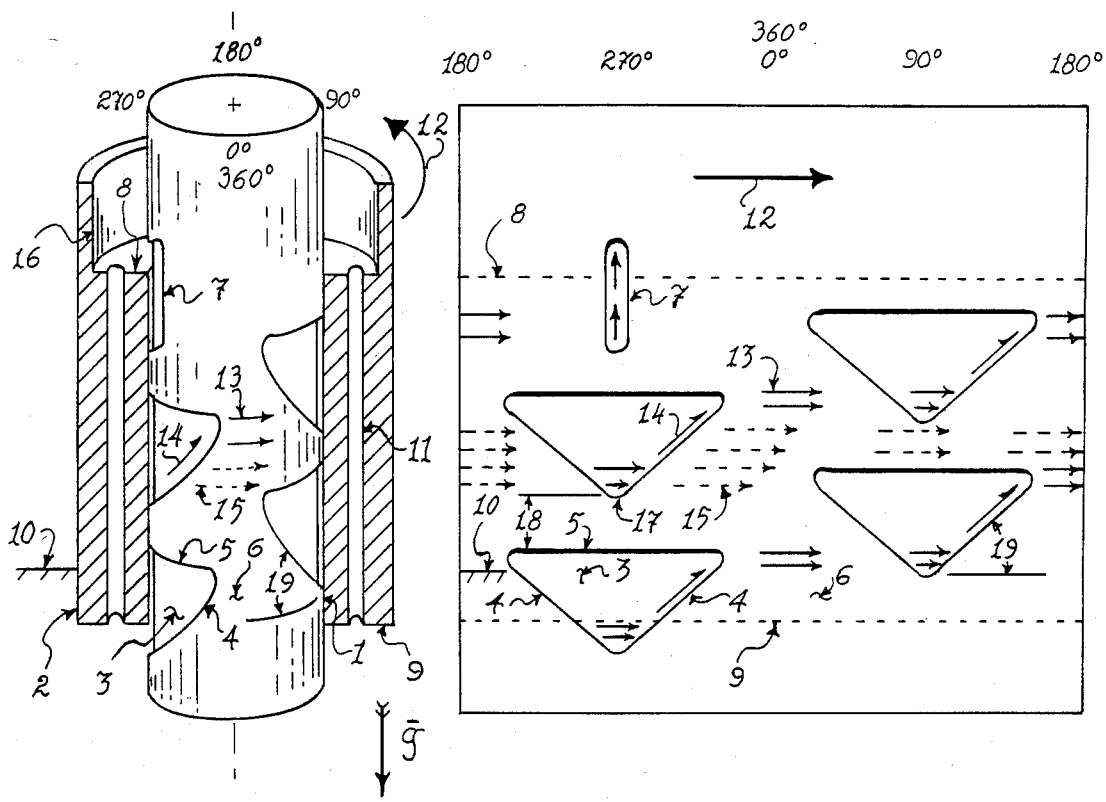
fig 1
fig 2
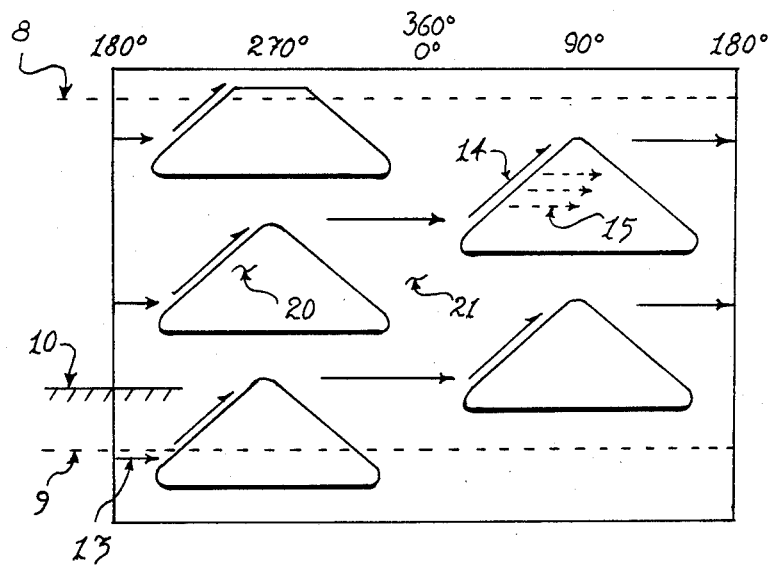
fig 3

REVERSIBLE JOURNAL BEARING UNIFLOW LUBRICATION SYSTEM

BACKGROUND OF THE INVENTION

Hydrodynamically supported vertical journal bearings have been used for ceiling fans before the turn of the century. The hydrodynamic radial suspension of the journal shaft was so effective in reducing wear, that some of the original fans, in nearly continuous operation, are still operating to this day!

The subject bearings are highly desirable for ceiling fan applications for a number of other reasons as well: they are essentially noiseless over the entire life of the fan, they have a substantially infinite life, and their energy efficiency is higher than that of comparable ball bearings.

In the original ceiling fans, the air flow was unidirectional only; recently it became desirable to reverse the air flow direction for energy efficient winter operation, or for low draft summer operation.

In the aforementioned state of the art vertical journal bearings, a helical groove on the journal is pumping the oil up in the vertical direction. If the shaft rotation were reversed, however, the oil would not be pumped up as required.

For this reason manually reversible pitch blades have been marketed for nonreversible rotors. These blades are, however, cumbersome to reverse in situ. A market survey indicated that this feature is the major reason for the "loss of sale" of the subject fan, since a number of comparably priced electrically reversible fans are being marketed, alas with greatly inferior bearings. It appears that the trend toward electrically reversible fans will accelerate.

The subject invention, accordingly, is directed but not limited toward ceiling fans with hydrodynamically suspended journal bearings, which bearings are capable of operating in both directions of rotation.

SUMMARY

For extremely long operating life bearings, hydraulically suspended shafts or journals have been used. These rotating shafts (or bearings) are typically suspended on a film of oil, so that no metal to metal contact exists, in steady state operation. A helical oil pumping groove, in the shaft or bearing, is commonly used to transport the oil along the shaft, from the reservoir. The oil is then forced into the load bearing region by adhesion of the oil to the metal surfaces, by the relative motion of the journal and bearing surfaces, and by the existence of viscous forces in the oil, as explained by the classical lubrication theory. In the case of vertical bearings, the thrust load is usually supported by ball thrust bearings, which are inherently self adjusting for a considerable amount of wear. The oil reservoir is typically placed at the bottom end of the shaft, and the ball bearing is immersed in the oil reservoir for ample lubrication. Radial ball bearings, of course, are not capable of taking up radial play, and would chatter excessively when worn. Invariably, some of the fan components resonate when excited by the bearing chatter, and greatly amplify the noise.

The working fluid exits at the top of the bearing into a manifold, and it is usually gravity fed back into the reservoir, thru a passageway.

At startup and at shutdown, when the rotational speed is low, metal to metal contact may exist while the oil film pressure is too low to support the radial load. Essentially this is the only time that radial bearing wear may exist.

The above described vertical journal bearing suffers from an inherent inability to feed oil from the reservoir at both directions of shaft rotation. This feature of rotational reversibility is highly desirable for ceiling ventilating fans. The subject invention solves the problem of unidirectionality of rotation of the helically grooved vertical journal bearing.

The invention utilizes an interlocking array of triangular pumping cavities on the surface of the journal. It contains a ciontinuous throttling ring above each row of pumping cavities, these rings also serve as load bearing surfaces on the circumference of the journal. The arrays of triangular pumping cavities are completely symmetrical about the journal axis, hence the direction of the fluid flow is independent of the direction of rotation of the moving assembly.

The helical pumping grooves are typically of the low pressure types, with open groove ends and deep channels. The subject invention utilizes closed ended or throttled grooves, with shallow grooves so that back flow is minimized. These pumping grooves are capable of developing considerable fluid pressures.

Pumping cavity parameters are optimized by the "Linearized Turbulent Lubrication Theory" developed by Ng and Pan (*Journal of Basic Engineering,* Transactions of ASME. September 1965), and refined by Chow and Vohr (*Journal of Lubrication Technology,* Trans. ASME. 1969 LUB-28).

By optimizing cavity depth, cavity wall angle, and pumping cavity length to journal length ratio, for a given set of operating conditions, relatively large pressure gradients and flow can be obtained along the journal axis.

Calculations indicate that the optimum design parameters, for a stable journal bearing, operating in the range of laminar flow to 9000 Reynolds numbers are as follows:

Ratio of average groove width to groove plus land width $\alpha = 0.55$

Groove angle with circumferential line $B = 29.5°$

Ratio of length of grooving to total length of the journal $Y = 0.67$

Ratio of groove clearance to ridge clearance T:

| Reynolds No. | T |
| --- | --- |
| laminar, Re < 500 | 2.4 |
| 1000 | 3.1 |
| 5000 | 3.8 |
| 9000 | 3.8 |

All of the parameters above, except T, are quite insensitive to the Reynolds number. For a ceiling fan application T is usually 2.4, since it usually operates far in the laminar flow region.

DESCRIPTION OF THE DRAWINGS

FIG. 1 shows a schematic cutaway isometric view of the bearing and journal with triangular pumping cavities.

FIG. 2 shows a layout of the journal circumference with the triangular pumping cavities.

FIG. 3 shows a layout of the journal circumference with a triangular ridge surface array.

DESCRIPTION OF THE PREFERRED EMBODIMENT

Referring now to the drawing, wherein like reference numerals refer to like parts throughout, reference is first made to FIG. 1, where 1 is the journal or that part of the shaft which is within the bearing 2. Triangular cavities 3 are formed below the surface of the journal, with side walls 4, and upper walls 5.

An array of the above cavities 3, are formed such that any particular cavity 3 has its upper walls 5 higher than the apex formed by side-walls 4 of cavities of adjacent columns. But upper wall 5 of said cavity must be below the upper wall 5 of the cavities of the adjacent columns. In other words cavities in adjacent columns are axially offset relative to each other with a certain amount of axial overlap.

In practice it was found that ample fluid transfer took place between adjacent columns of cavities 3, and a relatively high load bearing capability was obtained, when one third of the lowest cavity 3 at the 270° column in FIG. 2 axially overlaps the lowest cavity 3 at the 90° column, and the spacing 18, between apex 17 and top surface 5 of cavities 3 is about one third of cavity 3 height. The diagram in FIG. 2 was drawn according to the above rules. The lowest cavity 3 in said array has its wall 4—4 apex region below the bottom edge 9 of the bearing 2, so that this cavity 3 is open to the fluid reservoir 10. Ridge 6 is formed at the interspace between said cavity array. A vertical channel 7 is located at the upper region of the journal and it extends beyond the upper edge 8 of the bearing 2. Openings of return fluid passageways 11 are located at return fluid manifold 16 of bearing 2.

The illustrative direction of rotation of the bearing 2, relative to the journal 1, is indicated by arrow 12. This relative motion 12, results in "dragging" the fluid adjacent to the bearing surface, in the direction indicated by arrows 13 and 15 on journal ridge 6. In the triangular cavity 3, the major mass flow with an axial vector component occurs along sidewall 4, and it is indicated by arrow 14. There is a secondary flow path along cavity sidewall 4, into the journal ridge 6 to bearing 2 clearance space, indicated by the arrows 13 and 15. The fluid in this clearance space is essentially supporting the load. The phenomena that takes place at wall 4, is similar to that of the helically grooved shaft, since this wall is actually a segment of a helix. The prior art helical oil pumping grooves are usually deep and open ended low pressure devices. The triangular pumping cavities 3 are relatively shallow, so that no significant reverse flow will occur in the cavity 3, and they are closed ended high pressure devices. The journal ridge 6 to bearing 2 clearance space is used to throttle the flow and hence it develops significant hydrodynamic pressures when properly designed. This in turn tend to improve the stability and load bearing capability of the journal bearing.

Typical bearing action takes place at the journal ridge 6, with only slight modifications, due to the triangular cavities. As the load in the bearing is increased, the clearance between the bearing and the journal decreases under the load. Since in a well designed journal bearing, only a small amount of axial flow exists at the load bearing surfaces, in order to maintain continuity of mass flow rate along the journal circumference, the flow velocity and pressure must inherently increase at the region of reduced clearance, the bearing hydraulic pressure increases until the load is balanced.

Part of the working fluid stream indicated by solid arrows 13 from ridge 6 is collected by the adjacent pumping cavity 3, and pumped further along the axial direction of the journal, as described above. In this manner the pumping cavities 3 provide lubrication to the journal ridge surface 6, along the entire length of the journal.

Near the top of the journal, corresponding with the last row of pumping cavity 3, a channel 7 is provided to feed the fluid into the collection manifold 16. The fluid is then recirculated thru chanel 11 to the reservoir 10.

The load in a free hanging ceiling fan's journal bearing is extremely small, so that the journal is essentially concentric with the bearing and the minimum clearance to nominal clearance ratio is approaching unity. Under these conditions there is another, alas trivial, solution to the non rotation sensitive vertical lubrication problem. This solution is not recommended but it is described and claimed for patent protection purposes. In this solution, referring to FIG. 3, triangular ridges 20 form an interlocking array, similar to that of the pumping cavity array. Solid arrows 13 indicate the fluid flow direction in the recessed interspace 21, between the ridges 20. Dotted arrows 15 indicate the fluid flow direction in the clearance space between the journal surface and the bearing, the load is supported by this fluid at the minimum clearance region. The undesirable feature of this solution is that the load bearing surfaces are not continuous, and the classical wedge shaped profile of the fluid film under the load is hence discontinuous. However, for extremely light loads, like that of the free hanging ceiling fan journal, even this configuration will work.

It is emphasized that the pumping cavities may be located in the journal or in the bearing, they work equally well. For manufacturability it is usually more convenient to cut the pattern into the journal. A numerical controlled screw mill is preferred for this operation, however, electrical discharge machining (EDM), precision die casting, or photo-etching techniques may be used.

The parameters of an optimized non-reversible pumping groove system are given in the summary; the detailed description of the terms as applied to the subject reversible uniflow bearing lubrication system shown on FIGS. 1 and 2 are as follows:

$\alpha$ = cavity area to total journal area ratio.
$\beta$ = helical segment angle 19 with circumferential line.
$Y$ = ratio of axial cavity length to total journal length.
$T$ = ratio of mean groove 3 clearance, to mean ridge 6 clearance (to bearing 2 respectively).
$R_e = (2\pi N\ RC)/v$
$N$ = relative speed between journal and bearing in rev./sec.
$R$ = radius of the journal, in.
$C$ = mean bearing to journal radial clearance, in.
$v$ = Kinematic viscosity of the fluid in in.$^2$/sec.

An advantage of the closed shallow pumping cavities 3, over deep helical grooves is that the lubricant is held in the cavities 3 for long periods of time, when the shaft is idle. At startup the bearing is completely lubricated at less than one revolution.

It should be understood that substantially any shaped pumping cavity with two regions making a negative and a positive slope with the circumferential line 8 respectively, will fulfill the requirements of the subject device.

It will be appreciated by those skilled in the art, that the invention may be carried out in various ways and may take various forms and embodiments other than those illustrative embodiments heretofore described. Accordingly, it is to be understood that the scope of the invention is not limited by the details of the foregoing description, and I intend by the following claims to cover all modifications within the spirit and scope of my invention.

What I claim to be new and desire to secure by Letters Patent of the United States are:

1. A lubricating fluid pumping and distribution system for a journal bearing wherein the axial fluid flow is the same for either clockwise or counterclockwise direction of journal bearing rotation, said system comprising a journal encircled by a cylindrical bearing, said system containing an array of close ended, shallow, individual pumping cavities which are arranged in at least two axial columns extending along the length of the relatively rotating surfaces on either the journal or bearing surface, two side walls of the cavities form a left and right helical segment respectively such that when relative rotation between the journal and the bearing occurs the helical segments will impart a uniaxial pressure gradient on the fluid, which pressure causes the fluid to flow from a lubricant reservoir at the bottom of the bearing in an axial direction within the pumping cavity and also into a clearance formed between the journal and bearing surfaces, said adjacent columns of pumping cavities are axially offset from cavities in the first column so that they collect some of the fluid in the clearance between the journal and the bearing and impart further axial movement to the lubricating fluid, said fluid thereby traversing and lubricating the entire length of the journal.

2. A lubricating fluid pumping and distribution system for a journal bearing wherein the axial fluid flow is the same for either clockwise or counterwise direction of journal bearing rotation, said system comprising a journal encircled by a cylindrical bearing, said system containing an array of pumping islands which are arranged in at least two axial columns extending along the length of the relatively rotating surfaces on either the journal or bearing surface, two side walls of the islands from a left and right helical segment respectively such that when relative rotation between the journal and the bearing occurs the helical segments will impart a uniaxial pressure gradient on the fluid, which pressure causes the fluid to flow from a lubricant reservoir at the bottom of the bearing, in an axial direction along the walls of the pumping islands and also into a clearance formed between the islands and bearing surface, said adjacent columns of pumping islands are axially offset from islands in the first column so that they impart further axial movement to the lubricating fluid, said fluid thereby traversing and lubricating the entire length of the journal.

* * * * *